United States Patent
Jonsson et al.

(10) Patent No.: US 9,430,300 B2
(45) Date of Patent: Aug. 30, 2016

(54) METHOD AND SYSTEM FOR TRANSPARENT NETWORK ACCELERATION

(71) Applicant: Wind River Systems, Inc., Alameda, CA (US)

(72) Inventors: Kenneth Jonsson, Sollentuna (SE);
Markus Carlstedt, Uppsala (SE);
Rikard Mendel, Stockholm (SE)

(73) Assignee: WIND RIVER SYSTEMS, INC., Alameda, CA (US)

( * ) Notice: Subject to any disclaimer, the term of this patent is extended or adjusted under 35 U.S.C. 154(b) by 531 days.

(21) Appl. No.: 13/707,143

(22) Filed: Dec. 6, 2012

(65) Prior Publication Data
US 2014/0164639 A1    Jun. 12, 2014

(51) Int. Cl.
| | |
|---|---|
| *G06F 15/16* | (2006.01) |
| *G06F 9/54* | (2006.01) |
| *H04L 12/26* | (2006.01) |
| *H04L 29/06* | (2006.01) |
| *H04L 29/08* | (2006.01) |

(52) U.S. Cl.
CPC ............... *G06F 9/54* (2013.01); *H04L 43/00* (2013.01); *H04L 63/1408* (2013.01); *H04L 67/12* (2013.01); *H04L 69/321* (2013.01)

(58) Field of Classification Search
CPC .................................................... H04L 12/825
USPC .......................................................... 709/233
See application file for complete search history.

(56) References Cited

U.S. PATENT DOCUMENTS

| | | | |
|---|---|---|---|
| 7,783,739 B1* | 8/2010 | Weigle | 709/224 |
| 2013/0007880 A1* | 1/2013 | Bosco et al. | 726/22 |

* cited by examiner

*Primary Examiner* — Yves Dalencourt
(74) *Attorney, Agent, or Firm* — Fay Kaplun & Marcin, LLP

(57) ABSTRACT

A method includes duplicating, by an acceleration engine that is associated with a software application executing in a computing environment, a state of a kernel stack of an operating system of the computing environment to generate a duplicate network stack; receiving, by the acceleration engine, a request by the software application to send traffic over a network interface; and sending, by the acceleration engine, the request to a network driver relating to the network interface.

20 Claims, 3 Drawing Sheets

METHOD AND SYSTEM FOR TRANSPARENT NETWORK ACCELERATION

BACKGROUND

Network connectivity is used by a wide variety of software to accomplish different types of tasks. A typical computing environment may simultaneously execute multiple software applications, and therefore may have its network resources shared among multiple requesters. Therefore, users may wish to have high-priority tasks receive improved network performance.

SUMMARY OF THE INVENTION

The present invention is directed to a method including duplicating, by an acceleration engine that is associated with a software application executing in a computing environment, a state of a kernel stack of an operating system of the computing environment to generate a duplicate network stack; receiving, by the acceleration engine, a request by the software application to send traffic over a network interface; and sending, by the acceleration engine, the request to a network driver relating to the network interface.

The present invention is further directed to a method including duplicating, by an acceleration engine that is associated with a software application executing in a computing environment, a state of a kernel stack of an operating system of the computing environment to generate a duplicate network stack; monitoring a network interface for incoming traffic for the software application; receiving, by the acceleration engine, the incoming traffic for the software application using information in the duplicate network stack; and sending, by the application, the incoming traffic to the software acceleration.

DETAILED DESCRIPTION

Figure 1:
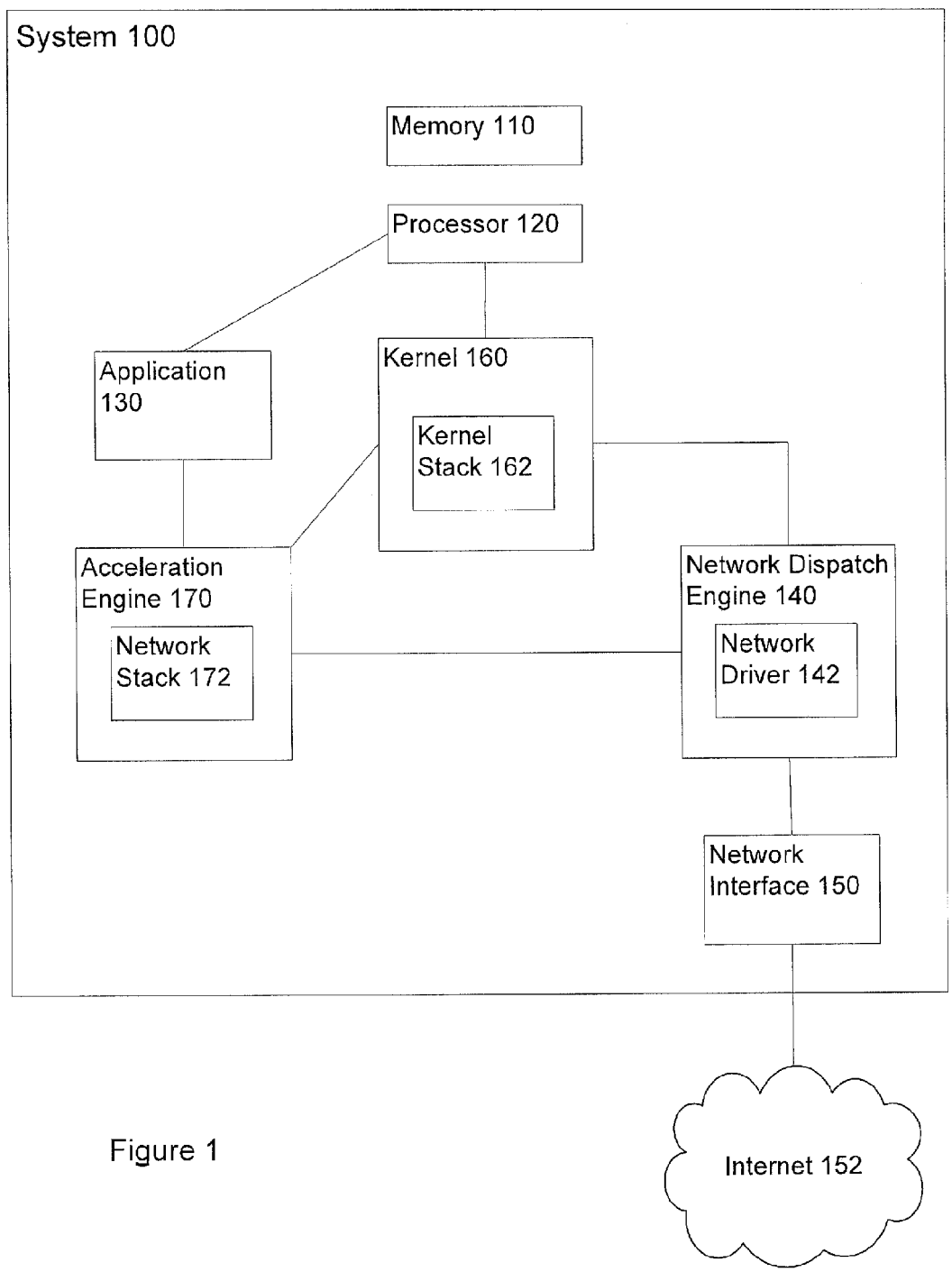
FIG. 1 shows a schematic illustration of a system for providing network acceleration according to an exemplary embodiment.

The exemplary embodiments may be further understood with reference to the following description of exemplary embodiments and the related appended drawings, wherein like elements are provided with the same reference numerals. Specifically, the exemplary embodiments relate to methods and systems for accelerating the performance of network applications in a scalable manner without modifying the application to be accelerated.

Modern software typically requires network connectivity for a wide variety of tasks, from the initial procurement of software and validation of installations, to the acquisition of various types of content, to the sharing of user-generated content. Thus, a typical computing environment may simultaneously execute multiple applications requiring network access for a variety of tasks. As a result, improved network performance has benefits including increased efficiency and a more pleasant user experience. However, existing techniques for accelerating network performance require modification of the code of the application to be accelerated, which is typically beyond the capability and authority of an end user, or scale poorly in operating environments with multiple CPU cores.

Typically, when packets are to be sent via a network interface, the application sending the packets calls a function invoking operating system ("OS") features for performing network communication tasks. The OS then performs various related to network communication, including accessing the system kernel, accessing a network device driver, activating the driver, and sending the data using the network interface according to the protocols of the driver. The process for receiving data is substantially similar. The exemplary embodiments may provide for acceleration of the performance of selected applications without the need to modify the application, or to install additional hardware or software, by eliminating the need to access the system kernel during network communication tasks.

FIG. 1 schematically illustrates a system 100 according to an exemplary embodiment. The system 100 includes a memory 110 storing data and instructions, and a processor 120 executing instructions as will be described hereinafter. The processor executes, among other tasks, application 130, which will be accelerated according to an exemplary embodiment. The system 100 also includes a network dispatch engine 140 and network driver 142 providing for software interaction with a network interface 150. In one exemplary embodiment, the network driver 142 may be a poll mode driver. The network dispatch engine 140 may be a software application providing for proper routing of traffic to and from the network driver 142, as will be described in further detail below. The network interface 150 may be any type of wired or wireless network interface enabling the system 100 to communicate with other computing systems (e.g., an Ethernet device, a cellular transceiver, a local area wireless transceiver, a personal area wireless transceiver, etc.); in one example, the network interface 150 may communicate with the Internet 152. The system 100 also includes a kernel 160, which may be a standard operating system kernel as is known in the art. The kernel 160 includes a kernel stack 162, which, like the kernel 160, is a standard operating system kernel stack as is known in the art.

The processor also executes an acceleration engine 170, which may be a software application performing network acceleration tasks according to an exemplary method which will be described in detail hereinafter. The acceleration engine 170 includes a network stack 172 that mirrors the state of the kernel stack 162. When the acceleration engine 170 is initialized, it polls the kernel stack 162 for the entirety of its contents, including port addresses, etc., and creates the network stack 172. Subsequently, the acceleration engine 170 constantly monitors the kernel stack 162 for changes and, when such changes occur, updates the network stack 172 to mirror the changes. The acceleration 170 does not make any changes to the kernel stack 162.

The exemplary system 100 is described herein as containing one acceleration engine 170. However, in other exemplary systems, multiple simultaneous instances of an acceleration engine 170 may be present in order to provide for simultaneous acceleration of multiple applications such as the application 130 of FIG. 1. In such an embodiment, each acceleration engine 170 will include its own network stack 172.

Figure 2:
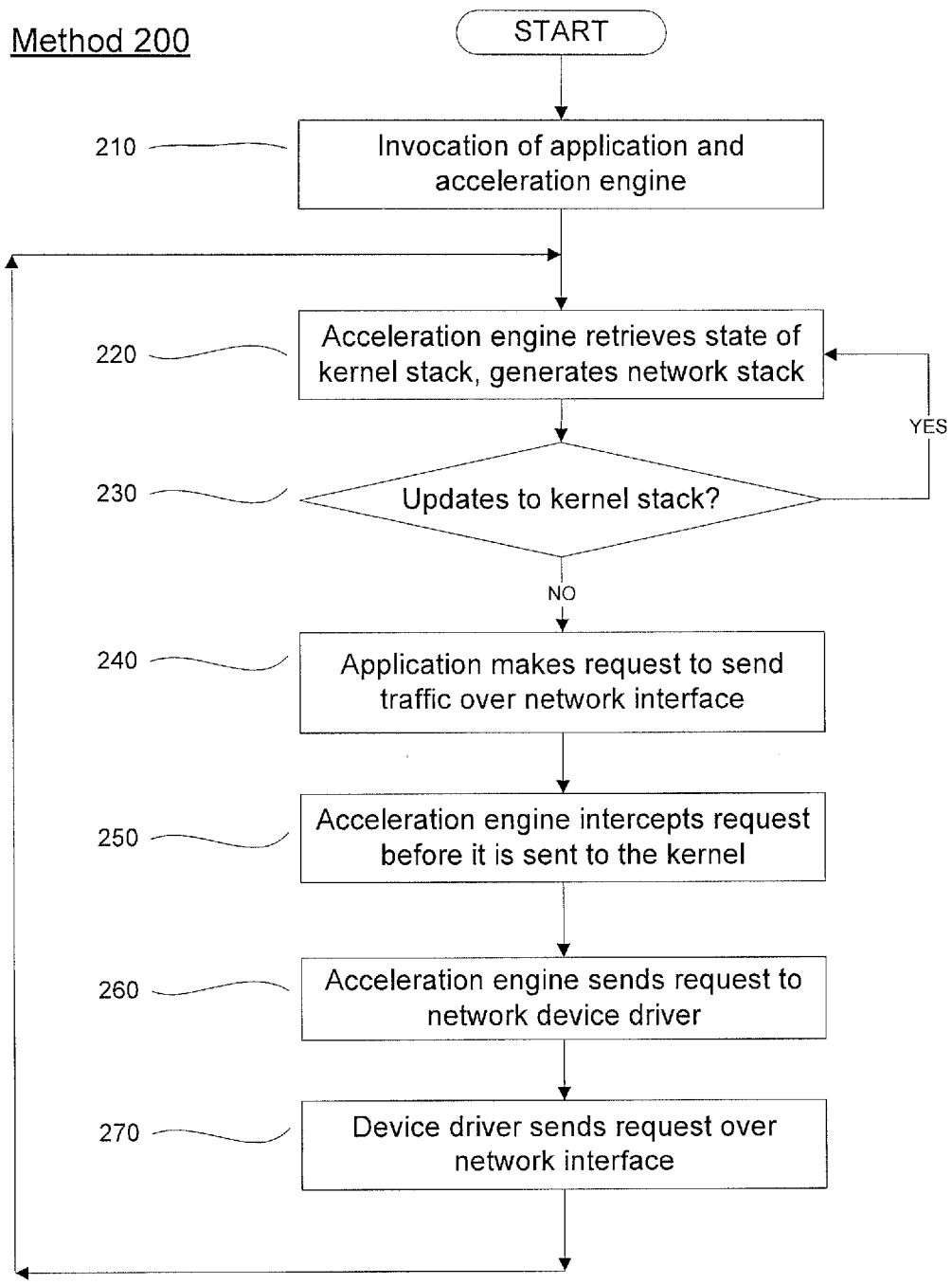
FIG. 2 shows an exemplary method for accelerating upstream network traffic using a system such as the system of FIG. 1.

FIG. 2 illustrates an exemplary method 200 for accelerating outbound network traffic using an acceleration engine such as the acceleration engine 162 of FIG. 1. The method 200 will be described with reference to the elements of system 100, but those of skill in the art will understand that the method may alternately be practiced in any other type of system capable of doing so. Further, it was previously noted that systems other than the system 100 may employ multiple simultaneous instances of an acceleration engine such as the acceleration 162; in such systems, multiple simultaneous instances of the method 200 may be performed.

In step 210, the application 130 and the acceleration engine 170 are invoked. This may be accomplished by any method for invoking programs that is known in the art. In one exemplary embodiment, the application 130 may be pre-designated for acceleration, and the invocation of application 130 may automatically trigger the invocation of acceleration engine 170; in another exemplary embodiment, the application 130 and acceleration engine 170 may be independently invoked. Invocation of the acceleration engine 170 may include automatic or manual selection of the network interface 150, which may be the only network interface present in the system 100 or may be one of a plurality of network interfaces within the system 100.

In step 220, the acceleration engine 170 retrieves the full state of the kernel stack 162, as described above, and duplicates the entire contents of the kernel stack 162 in network stack 172. This may be accomplished using standard techniques for kernel access. Specific information to be copied may include the state of the forwarding information base, all IP addresses assigned to all interfaces, all port assignments, all sockets, all security associations, and all security policies. The acceleration engine 170 may also obtain information relating to the network dispatch engine 140, the network driver 142 and the network interface 150, including any libraries and functions required to access the access the network interface 150. This information may enable the acceleration engine 170 to accelerate network activity, as will be described in further detail below.

In step 230, the acceleration engine 170 checks for updates to the kernel stack 162. If so, the method returns to step 220, where the acceleration engine 170 retrieves the contents of the kernel stack 162 and updates the network stack 172 accordingly. The effect of this step is that the acceleration engine 170 is constantly monitoring the kernel stack 162 for changes in order to ensure that the network stack 172 constantly mirrors the status of kernel stack 162. With the network stack 172 updated to mirror the kernel stack 162, the method proceeds to step 240. As noted above, once this has been done, all functions relating to networking tasks are handled by the acceleration engine 170, without the need to access the kernel 160.

In step 240, the application 130 makes a request that requires traffic to be sent over network interface 150. It will be apparent to those of skill in the art that the exact nature of the application 130 and the traffic to be sent via network interface 150 may vary for differing applications 130, and that the method 200 may proceed in the same manner regardless of the specific nature of the application 130 or the traffic. In step 250, the acceleration engine 170 detects the request by the application 130 and intercepts it before any interrupts are generated to access the kernel 160. As described above, in the method 200, the request may be sending traffic over network interface 150.

In step 260, the acceleration engine 170 uses the information obtained in step 220 to send the request by application 130 via network dispatch engine 140 directly to network driver 142, without the need to access the kernel 160 or generate any interrupts that would slow down the processing of the request. In an embodiment in which the acceleration engine 170 and network driver 142 are in separate address spaces, a mechanism for inter-process communications, such as a lockless ring-buffer in a shared memory area, may be used to communicate data from the acceleration engine 170 to the network driver 142.

In step 270, the network driver 142 sends the request over the network interface 150. It will be apparent to those of skill in the art that, once the request has been received by the network driver 142, the processing of the request by the network driver 142 and the network interface 150 may proceed in the same manner as it would proceed if the request had been routed through the kernel 160. It will be further apparent to those of skill in the art that, because the request is sent from network interface 150 as normal, and because the network stack 172 mirrors the kernel stack 162, including addresses, ports, security settings, etc., any downstream recipient of the request will not notice any difference in the request than if the request had been sent via standard processes.

After step 270, the method returns to step 230. The acceleration engine 170 continues monitoring the kernel stack 162 for changes and updating the network stack 172 as necessary, until another request is received from application 130. It will be apparent to those of skill in the art that method 200 is continually performed during the period that application 130 and acceleration engine 170 are active, and may end when application 130 and acceleration engine 170 are terminated through any standard means of terminating software applications.

Figure 3:
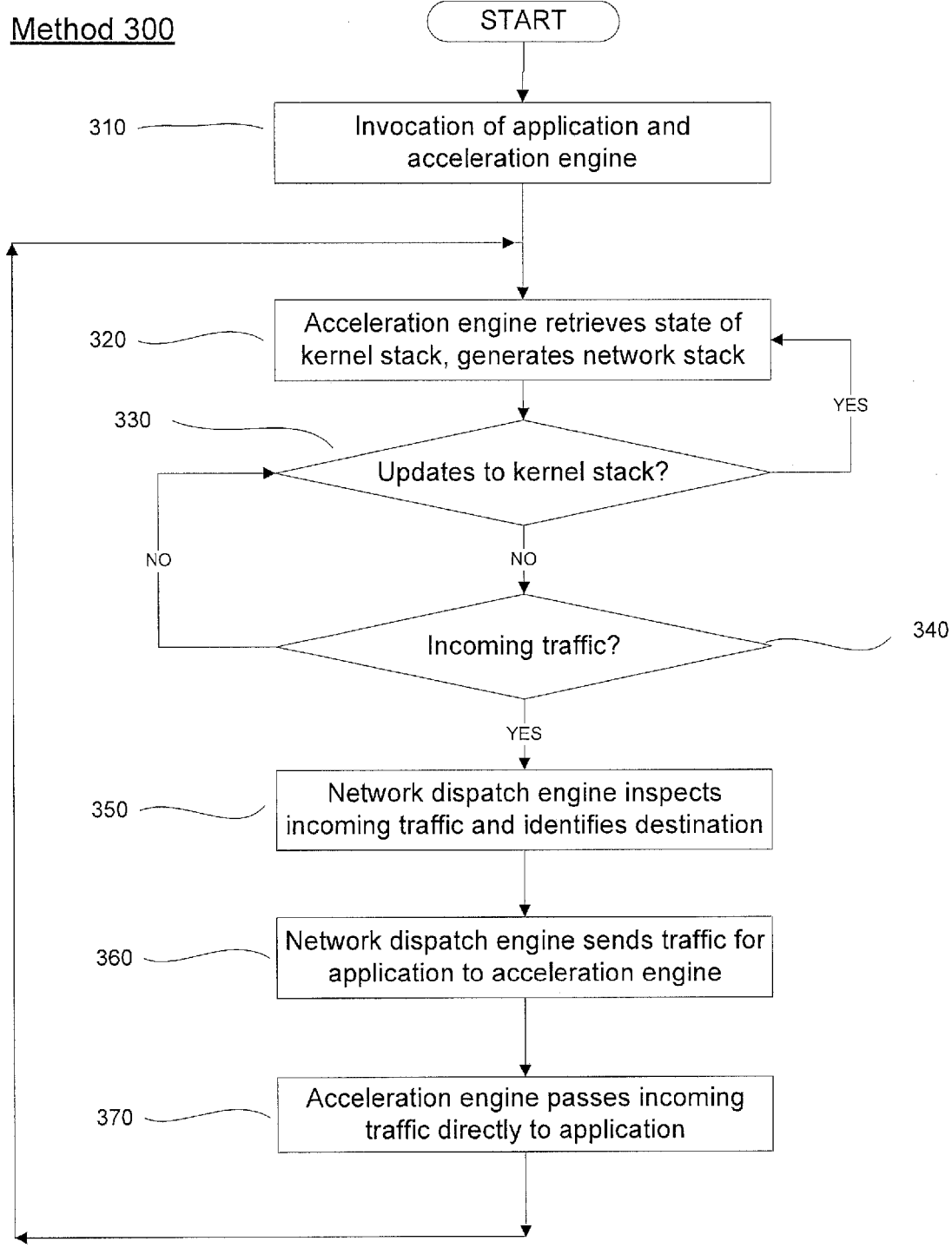
FIG. 3 shows an exemplary method for accelerating downstream network traffic using a system such as the system of FIG. 1.

FIG. 3 illustrates a method 300 by which inbound network traffic may be accelerated using an acceleration engine such as the acceleration engine 170 of FIG. 1. The method 200 will be described with reference to the elements of system 100, but those of skill in the art will understand that the method may alternately be practiced in any other type of system capable of doing so.

The method 300 begins in a substantially similar manner to the method 200. In step 310, the application 130 and the acceleration engine 170 are invoked. This may be accomplished by any method for invoking programs that is known in the art. In one exemplary embodiment, the application 130 may be pre-designated for acceleration, and the invocation of application 130 may automatically trigger the invocation of acceleration engine 170; in another exemplary embodiment, the application 130 and acceleration engine 170 may be independently invoked. Invocation of the acceleration engine 170 may include automatic or manual selection of the network interface 150, which may be the only network interface present in the system 100 or may be one of a plurality of network interfaces within the system 100.

In step 320, the acceleration engine 170 retrieves the full state of the kernel stack 162, as described above, and duplicates the entire contents of the kernel stack 162 in network stack 172. This may be accomplished using standard techniques for kernel access. Specific information to be copied may include the state of the forwarding information base, all IP addresses assigned to all interfaces, all security associations, and all security policies. The acceleration engine 170 may also obtain information relating to the network dispatch engine 140, the network driver 142 and the network interface 150, including any libraries and functions required to access the access the network interface 150. This information may enable the acceleration engine 170 to accelerate network activity, as will be described in further detail below.

In step 330, the acceleration engine 170 checks for updates to the kernel stack 162. If so, the method returns to step 320, where the acceleration engine 170 retrieves the contents of the kernel stack 162 and updates the network stack 172 accordingly. The effect of this step is that the acceleration engine 170 is constantly monitoring the kernel stack 162 for changes in order to ensure that the network stack 172 constantly mirrors the status of kernel stack 162. With the network stack 172 updated to mirror the kernel stack 162, the method proceeds to step 340. As noted above, once this has been done, all functions relating to networking tasks are handled by the acceleration engine 170, without the need to access the kernel 160.

In step 340, the network dispatch engine 140 determines whether any incoming traffic has been received at the network interface 150. This may be accomplished by monitoring the buffers of network driver 142 where the network driver 142 is a poll mode driver. If no relevant traffic has been received, the method returns to step 330, and the acceleration engine 170 continues monitoring the kernel stack 162 to keep the network stack 172 updated to mirror its status.

If the network dispatch engine 140 finds incoming traffic in step 340, then in step 350 the incoming packets are assessed to determine their destination (i.e., to application 130 being serviced by acceleration engine 170 or elsewhere). In one embodiment, the network dispatch engine 140 may access a database storing information about the application 130 and the acceleration engine 170 (or, in an embodiment including multiple acceleration engines 170 accelerating multiple applications 130, about each match pair of application 130 and acceleration engine 170). In one embodiment, the database may store a five-tuple including protocol, local address, local port, remote address, and remote port, for each accelerated application 130. Traffic is identified as belonging to accelerated application 130 of its five-tuple (or other identifying data in differing embodiments) matches that of the application 130.

In step 360, traffic for the application 130 is sent by network dispatch engine 140 to acceleration engine 170. This step may be performed without accessing the kernel 160 or generating any interrupts that would slow the transmission of network data or the overall performance of system 100. It will be apparent to those of skill in the art that in a system with multiple applications 130 being accelerated by multiple acceleration engines 170, the traffic will be sent to the appropriate acceleration engine 170 based on the determination made in step 350. It will be further apparent to those of skill in the art that any traffic received over network interface 150 that is not identified as being destined for application 130 may be sent to the kernel stack 160 via a proxy interface representing the network interface 150 in the kernel stack 160, and may then be processed as normally by kernel 160.

Additionally, it will be apparent to those of skill in the art that the sender of traffic received in this manner will not notice any difference in the behavior of the system 100, because of the mirroring of kernel stack by network stack 172. In another embodiment, the network interface 150 or network driver 142 may be programmed to inspect incoming traffic, determine whether it is destined for application 130, and route it accordingly. In such an embodiment, no network dispatch engine 140 may be present; however, it will be apparent to those of skill in the art that the method 300 may proceed in the same manner regardless.

In step 370, the traffic received by the acceleration engine 170 in step 360 is passed to application 130. This step is also performed without accessing the kernel 160 or generating any interrupts that would slow the transmission of network data or the overall performance of system 100. It will be apparent to those of skill in the art that the application 130 may receive the incoming traffic in the same manner as unaccelerated traffic, because of the use of network stack 172 and its mirroring of the kernel stack 162, and that the application 130 will not detect any difference in the incoming traffic or handle it any differently than unaccelerated traffic.

Following step 370, the method returns to step 330. The acceleration engine 170 continues monitoring the kernel stack 162 for changes and updating the network stack 172 as necessary, until another request is received from application 130, or until further incoming traffic is detected by network dispatch engine 140. It will be apparent to those of skill in the art that method 300 is continually performed during the period that application 130 and acceleration engine 170 are active, and may end when application 130 and acceleration engine 170 are terminated through any standard means of terminating software applications.

Those of skill in the art will understand that while method 200 describes a method for sending traffic and method 300 describes a method for receiving traffic, an acceleration engine 170 may be capable of performing both tasks, as well as other network tasks not specifically described herein. Thus, the acceleration engine 170 may initiate its operation and update its network stack 172 as described above with reference to the substantially similar sets of steps 210-230 and steps 310-330, and may then proceed with the subsequent steps of method 200 or of method 300 depending on the specific tasks invoked by application 130. Once the sending process of method 200 or the receiving process of method 300 has been completed, the acceleration engine 170 may then continue updating the network stack 172 as described above, until the application 130 and the acceleration engine 170 are terminated.

The exemplary embodiments may enable network communication to and from a software application to be handled in a faster manner than with prior methods. The network acceleration provided in this manner is scalable through the use of additional acceleration engines such as that of the exemplary embodiments to accelerate additional software applications. Because each acceleration engine uses its own network stack that mirrors the state of the kernel stack, no locks are required for access to the network stack by the acceleration engine, and there is no cache pollution from synchronization between instances. The acceleration provided may therefore be well suited to high-frequency trading, signaling protocols, Voice over Internet Protocol ("VoIP"), and other applications that may perform a large number of send/receive operations per unit of time and, therefore, have a requirement for accelerated performance.

The exemplary embodiments may accelerate network performance because accesses to the network driver may be accomplished using normal library calls, rather than system calls (as in a system where access to the kernel stack is required) or inter-process calls (as in a system that uses a single network stack running in user space to accelerate all network traffic). Acceleration according to the exemplary embodiments may also be accomplished without the use of a hypervisor. Additionally, the acceleration may be transparent to both applications being accelerated and to external observers, because the mirrored network stack mimics all the properties of the kernel stack and the acceleration engine uses the same network driver in the same manner as are used in standard networking methods.

Those of skill in the art will understand that the above-described exemplary embodiments may be implemented in any number of matters, including as a software module, as a combination of hardware and software, etc. For example, the acceleration engine 170 and network dispatch engine 140 may be embodied in a program stored in a non-transitory storage medium and containing lines of code that, when compiled, may be executed by a processor.

It will be apparent to those skilled in the art that various modifications may be made to the exemplary embodiments, without departing from the spirit or the scope of the invention. Thus, it is intended that the present invention cover modifications and variations of this invention provided they come within the scope of the appended claims and their equivalents.

What is claimed is:

1. A non-transitory computer-readable medium including a set of instructions, executable by a processor, wherein execution of the instructions causes the processor to perform operations comprising:
   duplicating, by an acceleration engine that is associated with a software application executing in a computing environment, a state of a kernel stack of an operating system of the computing environment to generate a duplicate network stack;
   receiving, by the acceleration engine, a request by the software application to send traffic over a network interface; and
   sending, by the acceleration engine, the request to a network driver relating to the network interface without accessing the kernel stack.

2. The computer-readable medium of claim 1, wherein the driver is a poll mode driver.

3. The computer-readable medium of claim 2, wherein the acceleration engine writes the request to a buffer of the poll mode driver.

4. The computer-readable medium of claim 1, wherein the network interface is one of a wired network interface and a wireless network interface.

5. The computer-readable medium of claim 1, wherein the software application comprises one of a high-frequency trading application, a signaling protocol, and a Voice over Internet Protocol application.

6. The computer-readable medium of claim 1, wherein the computing environment is a multi-processor computing environment.

7. The computer-readable medium of claim 1, wherein the operating system is a Linux operating system.

8. The computer-readable medium of claim 1, wherein the state of the kernel stack includes one of a forwarding information base, an IP address of the network interface, a port assignment, a socket, a security association, and a security policy.

9. The computer-readable medium of claim 1, wherein the computing environment includes a further software application, and wherein a further acceleration engine is associated with the further software application.

10. The computer-readable medium of claim 9, wherein the further acceleration engine duplicates the state of the kernel stack of the operating system of the computing environment to generate a further duplicate network stack.

11. A non-transitory computer-readable medium including a set of instructions, executable by a processor, wherein execution of the instructions causes the processor to perform operations comprising:
    duplicating, by an acceleration engine that is associated with a software application executing in a computing environment, a state of a kernel stack of an operating system of the computing environment to generate a duplicate network stack;
    monitoring a network interface for incoming traffic for the software application;
    receiving, by the acceleration engine, the incoming traffic for the software application using information in the duplicate network stack without accessing the kernel stack; and
    sending, by the acceleration engine, the incoming traffic to the software application without accessing the kernel stack.

12. The computer-readable medium of claim 11, wherein a network dispatch engine monitors a driver of the network interface, and wherein the acceleration engine receives the incoming traffic from the network dispatch engine.

13. The computer-readable medium of claim 12, wherein the driver is a poll mode driver.

14. The computer-readable medium of claim 13, wherein the acceleration engine monitors a buffer of the poll mode driver.

15. The computer-readable medium of claim 11, wherein the network interface is one of a wired network interface and a wireless network interface.

16. The instructions of claim 11, wherein the software application comprises one of a high-frequency trading application, a signaling protocol, and a Voice over Internet Protocol application.

17. The computer-readable medium of claim 11, wherein the computing environment is a multi-processor computing environment.

18. The computer-readable medium of claim 11, wherein the operating system is a Linux operating system.

19. The computer-readable medium of claim 11, wherein the state of the kernel stack includes one of a forwarding information base, an IP addresses of the network interface, a port assignment, a socket, a security association, and a security policy.

20. The computer-readable medium of claim 11, wherein the computing environment includes a further software application, and wherein a further acceleration engine is associated with the further software application, and wherein the further acceleration engine duplicates the state of the kernel stack of the operating system of the computing environment to generate a further duplicate network stack.

* * * * *